US010097714B2

(12) United States Patent
Schalk et al.

(10) Patent No.: US 10,097,714 B2
(45) Date of Patent: Oct. 9, 2018

(54) TRANSLATABLE SCANNER CALIBRATION TARGET

(71) Applicant: HEWLETT-PACKARD DEVELOPMENT COMPANY, L.P., Houston, TX (US)

(72) Inventors: Wesley R Schalk, Camas, WA (US); Al Olson, Vancouver, WA (US); Justin M Roman, Portland, OR (US); Jeffrey G Bingham, Vancouver, WA (US); Dennis Schissler, San Diego, CA (US); Andrew T Davis, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/519,860

(22) PCT Filed: Oct. 31, 2014

(86) PCT No.: PCT/US2014/063322
§ 371 (c)(1),
(2) Date: Apr. 18, 2017

(87) PCT Pub. No.: WO2016/068977
PCT Pub. Date: May 6, 2016

(65) Prior Publication Data
US 2017/0318173 A1    Nov. 2, 2017

(51) Int. Cl.
*G06F 3/12*         (2006.01)
*H04N 1/00*         (2006.01)
(Continued)

(52) U.S. Cl.
CPC ..... *H04N 1/00819* (2013.01); *H04N 1/00018* (2013.01); *H04N 1/00045* (2013.01);
(Continued)

(58) Field of Classification Search
CPC combination set(s) only.
See application file for complete search history.

(56) References Cited

U.S. PATENT DOCUMENTS 4,433,298 A * 2/1984 Palm .................. G03G 15/5037
                                                324/457
5,280,368 A   1/1994 Fullerton
(Continued)

FOREIGN PATENT DOCUMENTS

EP        2458839      5/2012
JP        2001-005119 A  1/2001

OTHER PUBLICATIONS

Smith. Estimating Scanning Characteristics from Corners in Bilevel Images. Jan. 24, 2001.
(Continued)

*Primary Examiner* — Helen Zong
(74) *Attorney, Agent, or Firm* — Robert C Sismilich

(57) ABSTRACT

In one example, a document scanner has a fixed-position scan bar and a built-in translatable calibration target. The scan bar has a linear array of imaging elements aimed in an imaging direction. The calibration target is spaced apart from and parallel to the linear array, and has a planar surface orthogonal to the imaging direction spanning the length of the linear array. The target is translatable during a calibration in a direction in a plane of the surface.

12 Claims, 11 Drawing Sheets

(51) Int. Cl.
*H04N 1/031* (2006.01)
*H04N 1/12* (2006.01)

(52) U.S. Cl.
CPC ....... *H04N 1/00087* (2013.01); *H04N 1/0312* (2013.01); *H04N 1/1225* (2013.01); *H04N 2201/0081* (2013.01); *H04N 2201/02497* (2013.01); *H04N 2201/0404* (2013.01); *H04N 2201/0448* (2013.01)

(56) References Cited

U.S. PATENT DOCUMENTS

| | | | |
|---|---|---|---|
| 5,813,771 | A | 9/1998 | Ur et al. |
| 6,470,099 | B1 | 10/2002 | Dowdy et al. |
| 7,856,331 | B2* | 12/2010 | Thompson ......... H04N 1/00002 356/256 |
| 8,786,914 | B1 | 7/2014 | Mui et al. |
| 2004/0081495 | A1 | 4/2004 | Nakamura et al. |
| 2009/0033957 | A1 | 2/2009 | Hardy |
| 2009/0116026 | A1* | 5/2009 | Imura ................... G01N 21/55 356/447 |
| 2009/0168116 | A1 | 7/2009 | Cui |
| 2011/0181924 | A1 | 7/2011 | Mui et al. |
| 2011/0205568 | A1* | 8/2011 | Moalem ............ G03G 15/0131 358/1.9 |
| 2011/0216178 | A1 | 9/2011 | Carpenter |
| 2012/0133995 | A1 | 5/2012 | Chun et al. |
| 2012/0236374 | A1 | 9/2012 | Takahara et al. |
| 2014/0029071 | A1 | 1/2014 | Roth et al. |
| 2014/0078560 | A1 | 3/2014 | Nagao et al. |

OTHER PUBLICATIONS

Oakham, P. The optimal optical readout for the x-ray light valve—Document scanners. University of Toronto, Dec. 2008.

\* cited by examiner

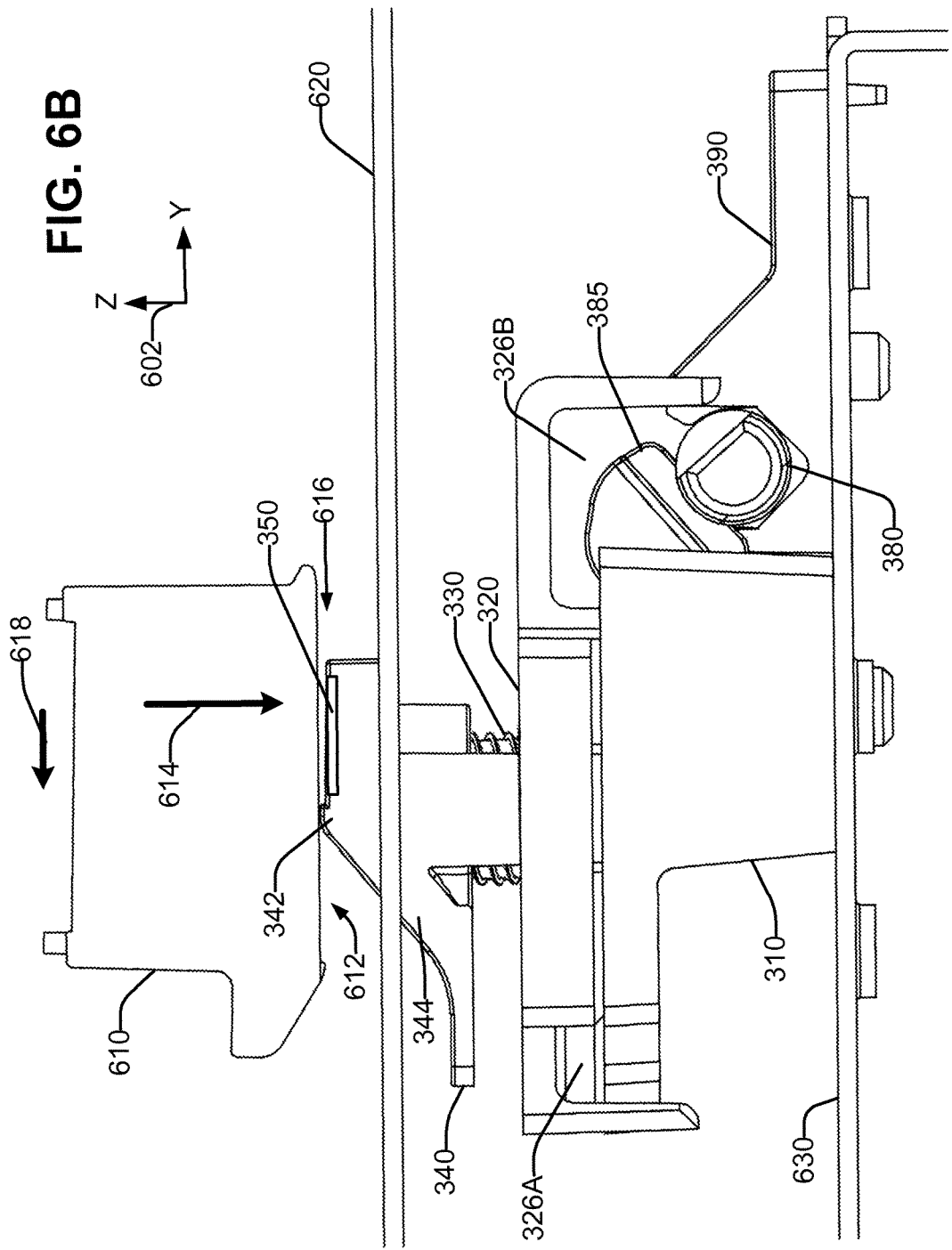

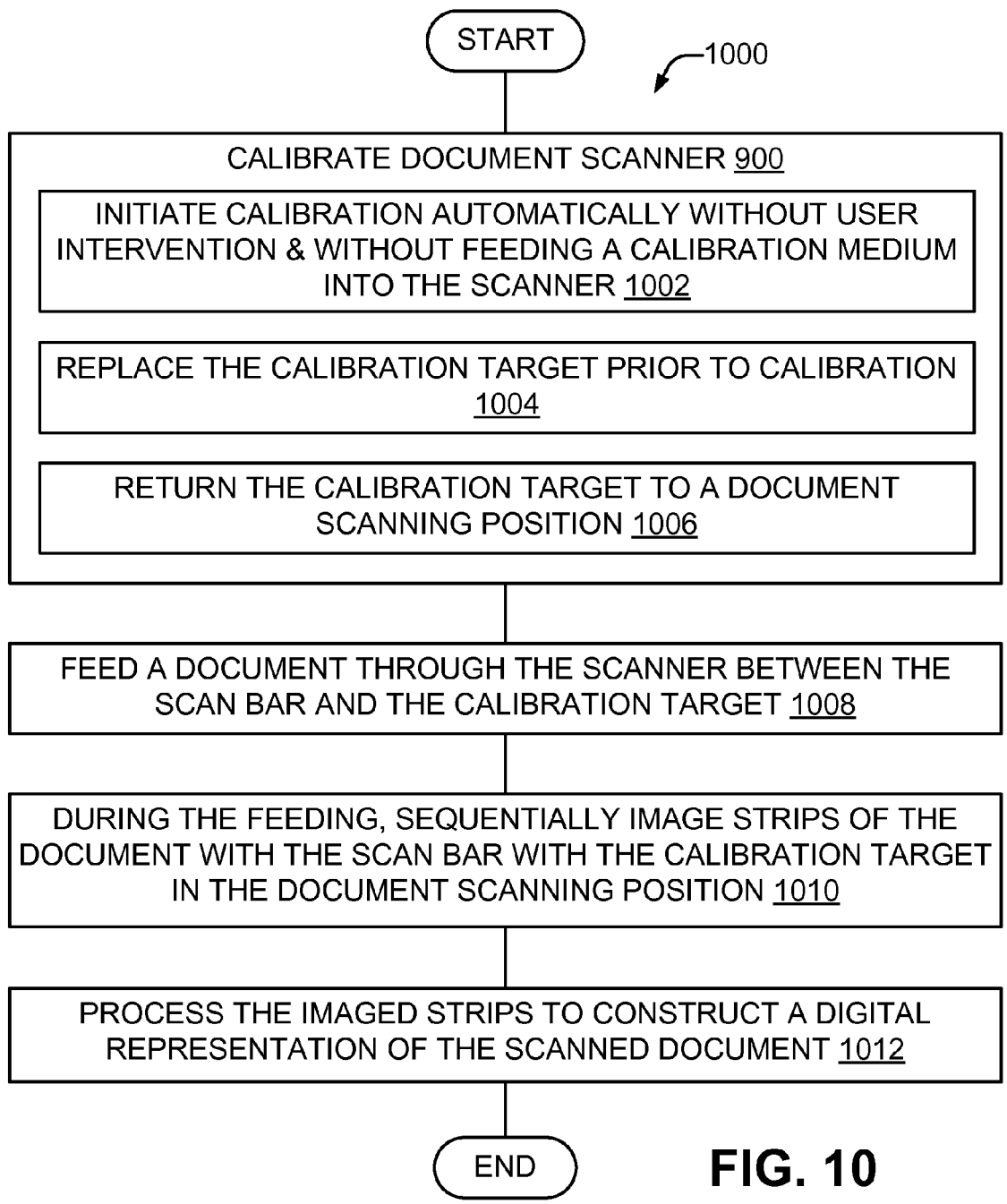

TRANSLATABLE SCANNER CALIBRATION TARGET

BACKGROUND

Optical image scanners are widely used for generating digital representations of real-world objects, particularly media such as documents which may include text, graphics, printed images, and the like. With flatbed scanners, media is maintained in a fixed position on a platen during scanning by a moveable scan bar. Alternatively, with document scanners (also called sheet-fed scanners), the media is fed past a fixed-position scan bar during scanning. In order to generate digital representations having high image quality, calibration of the scanner may be desirable. For some scan bar technologies, re-running the calibration may be desirable in order to ensure high image quality over time.

BRIEF DESCRIPTION OF THE DRAWINGS

FIG. 6B is a schematic side view of the scanner showing the bias plate assembly of FIG. 3 in a front-most position following translation during calibration, in accordance with an example of the present disclosure.

FIG. 10 is a flowchart in accordance with an example of the present disclosure of a method of scanning a document with the document scanner of FIG. 9.

DETAILED DESCRIPTION

Figure 1:
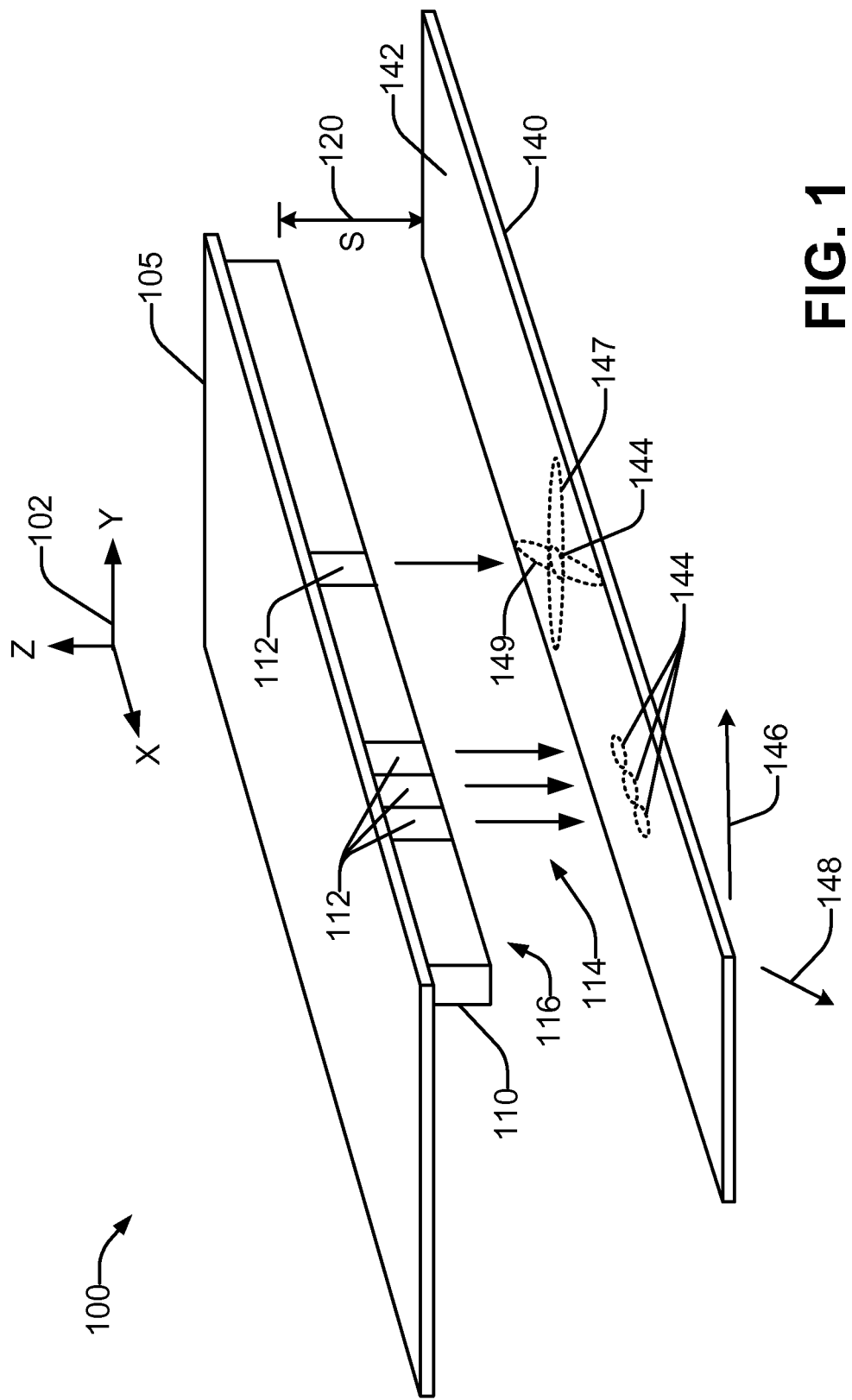
FIG. 1 is a schematic representation of a document scanner having a fixed-position scan bar and a built-in translatable calibration target in accordance with an example of the present disclosure.

Scan bars may utilize different technologies for their imaging elements. One type of scan bar may use CCD (charge-coupled device) elements. Another type of scan bar may use CIS (contact image sensor) elements. Each type may have its own characteristics. A CIS scan bar, for example, is relatively low in cost, small in size, high in resolution, and low in power usage. However, CIS lens arrays have a shallow depth of field. Objects positioned within 0.2 mm of the glass of the CIS module yield the best image quality when scanned. Scan quality degrades with increased distance to the CIS module lens array. CIS scan bars also provide the best image quality when they are periodically recalibrated.

As defined herein and in the appended claims, a "document scanner" may be broadly understood to be an optical imaging device in which documents to be scanned flow or are fed past a fixed-position scan bar of the scanner during an image scanning operation. As defined herein and in the appended claims, a "fixed-position scan bar" is a scan bar which does not move during a scanning operation performed by the document scanner.

One approach to calibrating scan bars in document scanners involves a user feeding and scanning a special calibration document. However, due to the user interaction, such a calibration cannot be performed automatically. Image quality of scan output can be degraded if the user delays or omits this manual calibration. And the special calibration documents can be easily damaged, and may be expensive and inconvenient to replace. Thus this approach to calibration often gives a poor user experience.

Another approach to calibrating scan bars in document scanners uses a cylindrical rotating calibration target built into the scanner. While this avoids the need for a special calibration document, the cylinder may have run-out or other characteristics such that the axis of rotation is not aligned with the lens array, or the cylinder is not flat against the scan bar. In the case of a CIS scan bar, due to the shallow depth of field, a scan of the calibration target using a cylinder which has such misalignment can result in a significant luminance change across the scanned image which degrades image quality. A similar luminance change can also occur where the cylindrical rotating calibration target also serves as a background when scanning transparent or translucent documents.

Yet another approach to calibrating fixed-position scan bars in document scanners uses a flat, static calibration target built into the scanner. A flat target helps to avoid luminance changes across the scan bar. However, if the target gets damaged (e.g. scratched, blemished, or covered with dust or contaminants), the calibrations may be unsuccessful or inaccurate as a result of some of the imaging elements imaging the damaged portions of the target surface, resulting in poor image quality from scans using the calibration results. In addition, it may be difficult and expensive to replace the target in the scanner, and this type of service operation usually cannot be done by a user.

Referring now to the drawings, there is illustrated an example of a document scanner with a built-in calibration target which can automatically perform calibrations without the use of a special calibration document and which can perform successful calibrations even with some imperfections in or on the calibration target. The document scanner includes a fixed-position scan bar having a linear array of imaging elements aimed in an imaging direction orthogonal to the array. Spaced apart from, and parallel to, the linear array is a translatable calibration target that has a planar surface orthogonal to the imaging direction which spans the length of the linear imaging element array. The target is translatable, during a calibration, in a direction in a plane of the surface.

Considering now one example document scanner, and with further reference to FIG. 1, a scanner 100 has a scan bar 110. The scan bar 110 is attached to a portion 105 of the scanner 100 in a fixed position, and the scan bar 110 does not move during a scan or imaging operation. The scan bar 110 has a substantially linear array of imaging elements 112 (several of which are illustrated). The imaging elements 112 each has a field of view, and are aimed in an imaging direction 114 orthogonal to the linear array. The scan bar 110 may include a lens array (not shown) that causes the field of view to have a predefined depth of field. In some examples, the lens array is a rod lens array.

The scanner 100 also has a built-in, translatable calibration target 140. The target 140 is spaced apart from, and parallel to, the scan bar 110. More particularly, the target 140 has a planar, flat surface 142 which is orthogonal to the imaging direction 114. The planar surface 142 defines an X-Y plane of a coordinate system 102. The target 140 has a size in the X direction that spans at least the distance in the X direction viewed by the scan bar 110, and a size in the Y direction that spans at least the distance in the Y direction viewed by the scan bar 110 throughout the translation of the target 140. The planar surface 142 is spaced apart from a planar surface 116 of the scan bar 110 by a distance S 120 in the Z direction of the coordinate system 102. In some examples, the spacing S 120 may be less than a predefined distance. In some examples the imaging elements 112 may be CIS elements, and the spacing S 120 may be 0.2 millimeters or less. Each imaging element 112 may view a corresponding imaged region 144 of the planar surface 142 for a given position of the target 140.

The target 140 is translatable within the scanner 100, and thus translatable with respect to the fixed-position scan bar 110. The target 140 translates in a given direction in the X-Y plane so as to maintain the spacing S 120 during translation. Thus the target 140 is wider in the Y direction than the size of an imaged region 144. In one example, the target 140 may translate by a distance of at least 0.20 millimeters. In another example, the target 140 may translate by a distance proportional to the size of the defect and the size of the imaged region 144, such that scan output corresponding to the defect can be excluded. In some examples, the target 140 translates during a calibration operation, and is maintained in a fixed position during a document scanning operation. The fixed position used during document scanning may be predefined.

The direction of translation of the target 140 in the X-Y plane, in some examples, may be in a direction 146 that is orthogonal to the linear array of imaging elements 112. In this case, the imaged region 144 moves along a linear zone 147 of the planar surface 142. In other examples, the direction of translation of the target 140 in the X-Y plane is in a direction 148 that is non-orthogonal to the linear array of imaging elements 112. In that case, the imaged region 144 falls along a linear zone 149 of the planar surface 142. As discussed subsequently in greater detail, the non-orthogonal direction 148 may provide increased calibration robustness in case of a blemished or damaged target surface 142. The target 140 has a sufficient width in the Y direction to ensure that all of zones 147, 149 fall onto the target 140.

In some examples, the planar surface 142 of a target 140 (which is not damaged or blemished) is substantially uniform in color. In some examples, this planar surface 142 is substantially white in color.

Figure 2:
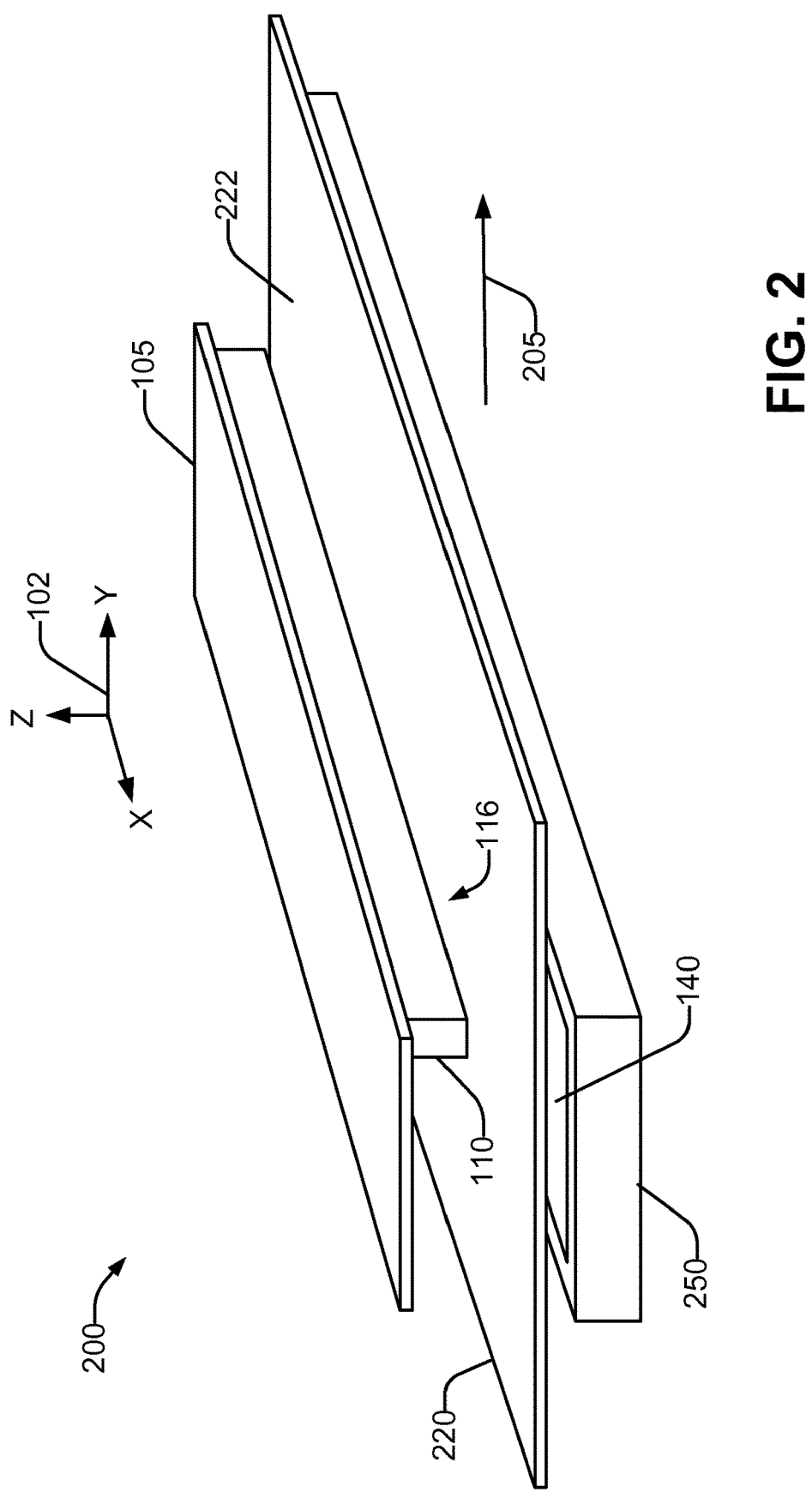
FIG. 2 is a schematic representation of the document scanner having a fixed-position scan bar and a built-in translatable calibration target with a document fed therethrough for scanning in accordance with an example of the present disclosure.

Considering now an example document scanner performing a document scanning operation, and with reference to FIG. 2, a document scanner 200 includes the scan bar 110 and the target 140. A document 220 is fed through the scanner 200 between the scan bar 110 and the target 140 in a predetermined direction 205. The target 140 is attached to, or in some cases integral to, a bias plate assembly 250. The bias plate assembly 250 maintains the surface 222 of the document 220 at a spacing from the surface 116 of the scan bar 110 which allow high quality imaging. In some examples, the bias plate assembly 250 does this by contacting the document 220 and urging the opposite surface 222 of the document 220 against the surface 116 of the scan bar 110. To accommodate various thicknesses of the document 220, at least an upper portion of the bias plate assembly 250, which may include the target 140, is movable in the Z direction of the coordinate system 102 so as to allow the surface 222 of various documents to be properly spaced apart from the surface 116. The upper portion of the bias plate assembly 250, including the target 140, may also be compliant so as to conform to irregularities in the surface 116 of the scan bar 110 and/or the document 220, particularly in situations where the bias plate assembly 250 contacts the surface 116 directly, or indirectly via the document 220.

In some examples, the direction of translation in the X-Y plane of the target 140 is the same as the document feed direction 205. In other examples, the direction of translation of the target 140 is a different direction in the X-Y plane from the document feed direction 205.

In some examples, the calibration target 140 also provides a background for a transparent or translucent document 220 during scanning. When scanning such documents, scan defects including shadows can result if the scanner 100, 200 does not provide a background of a uniform color (in some examples, white) for the portion of the document being scanned. The uniform color of the target 140 minimizes or prevents such scan defects when scanning generally transparent or translucent documents 220.

Figure 3:
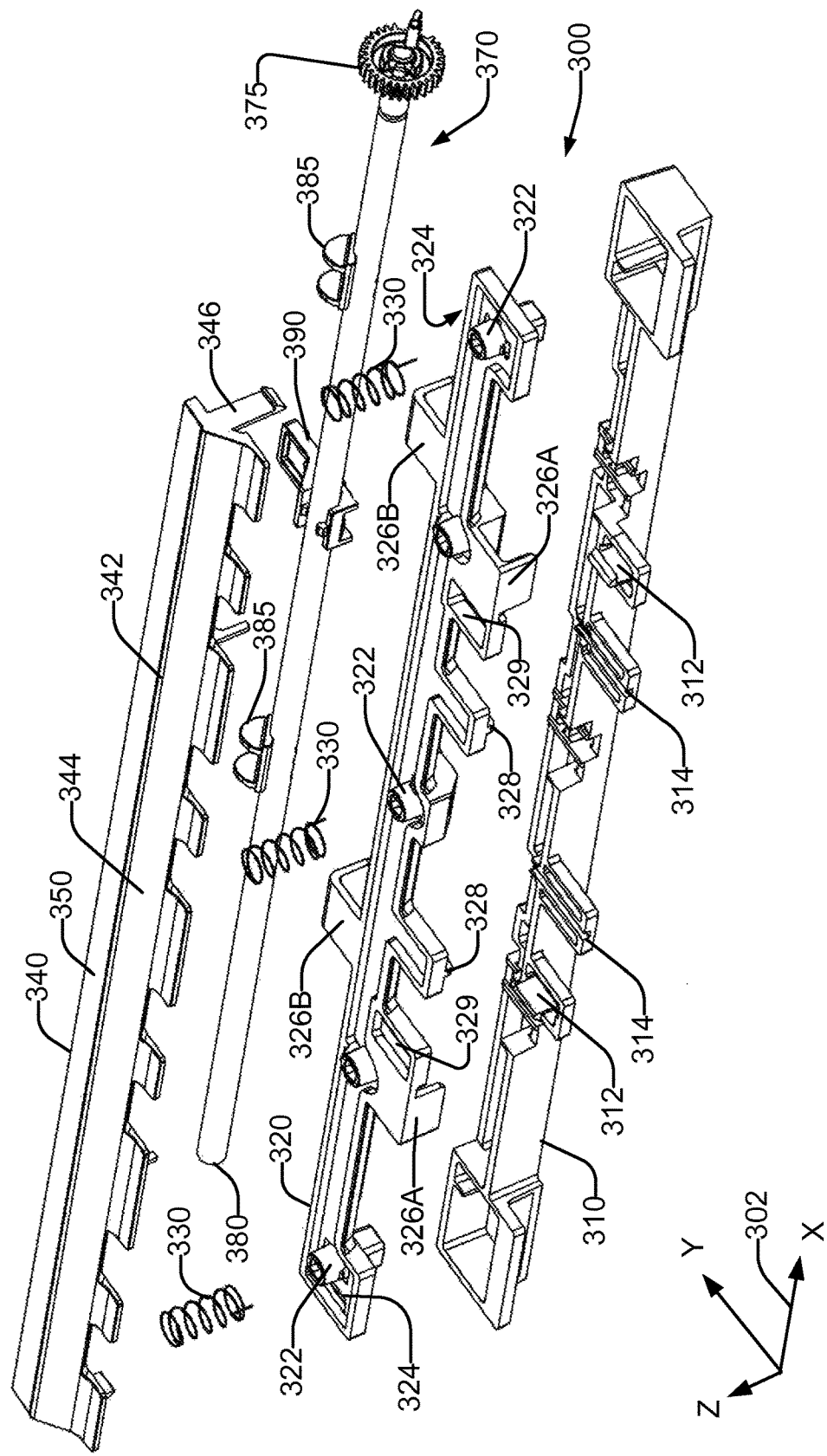
FIG. 3 is an exploded isometric representation of a bias plate assembly having a translatable calibration target, and drive system for the assembly of a document scanner in accordance with an example of the present disclosure.
Figure 4:
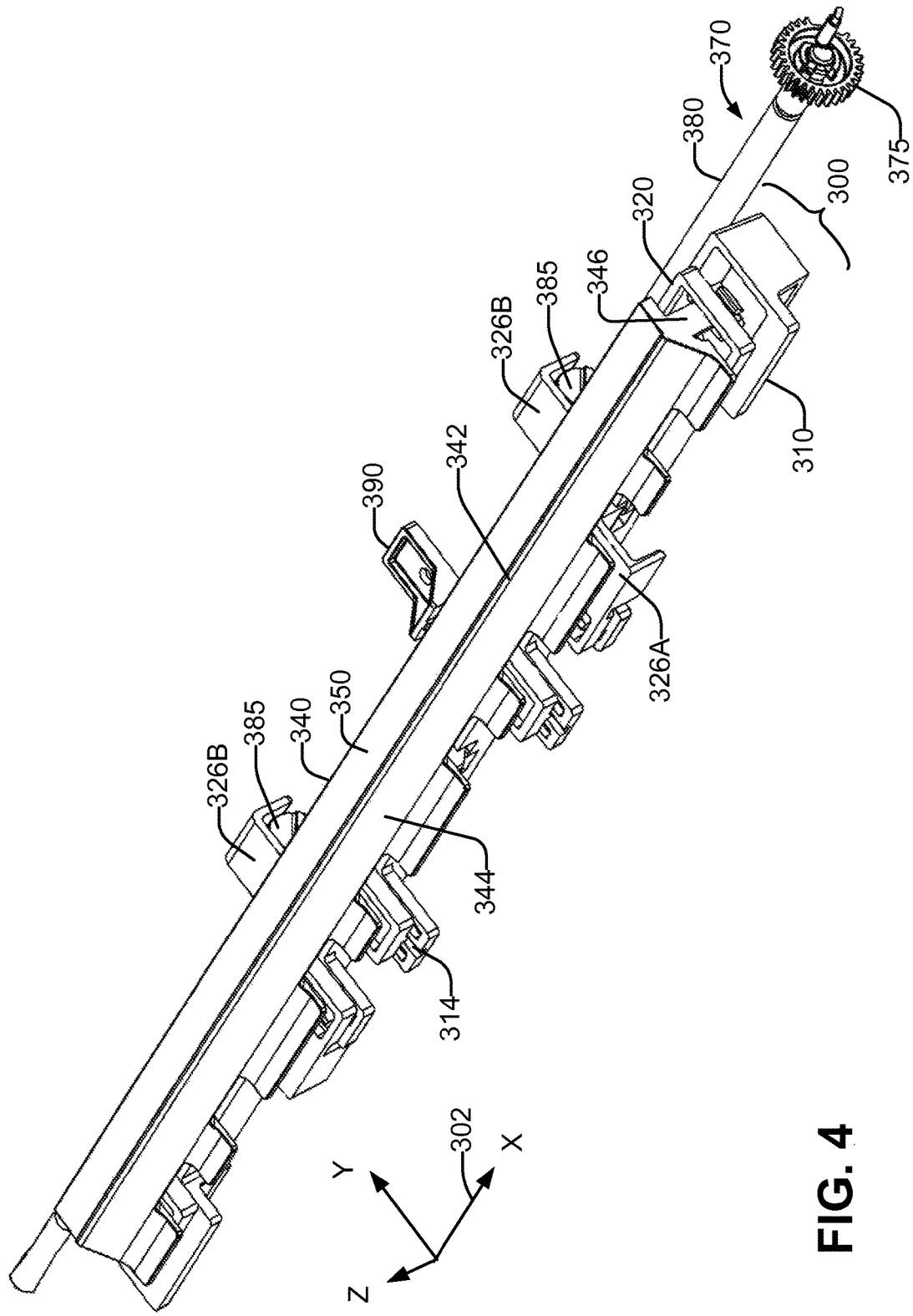
FIG. 4 is an assembled isometric representation of the bias plate assembly of FIG. 3 in accordance with an example of the present disclosure.

Considering now one example of a bias plate assembly having a translatable calibration target, and with reference to FIGS. 3 and 4, a bias plate assembly 300 includes a base 310, a carrier 320, at least one resilient member (which can take many forms as described below), and a bias plate 340 having a calibration target 350. The bias plate assembly 300 is coupled to a drive system 370 that is coupled to the carrier 320 to controllably slide the carrier 320 relative to the base 310. The drive system includes a drive 375, a cam shaft 380, at least one cam 385, and a bearing 390. FIG. 3 depicts an exploded view of the bias plate assembly. FIG. 4 depicts an assembled view of the bias plate assembly. In some examples, the bias plate assembly 300 is constructed mostly of low-cost molded plastic parts.

The bias plate 340 has the calibration target 350 attached to it, or integrally formed in or on it. The calibration target 350 is flat and uniform in color, and may be the calibration target 140 (FIGS. 1-2). A low rib 342 extends above the target 350 in the Z direction of the coordinate system 302. When the bias plate 340 is in contact with a document 220 (FIG. 2) being scanned, or with the surface 116 of the scan bar 110 (FIGS. 1-2), the rib 342 creates a small gap between the surface 116 and the target 350. This gap maintains a predefined spacing between the surface 116 and the target 350, and also protects the target 350 from wear due to contact with the document 220 or with the surface 116 of the scan bar 110. The bias plate 340 is flexible and compliant so as to conform to the surface 116. In one example, the bias plate 340 is molded of a low-cost uniform white ABS (acrylonitrile butadiene styrene) plastic material. In other examples, the bias plate 340 may be metal or another substance. The bias plate 340 also has a ramped lead-in surface 344 to assist with smoothly feeding the document 220 between the scan bar 110 and bias plate 340 and preventing jamming. At least one snap 346 of the bias plate 340 fixedly attach the bias plate 340 to the carrier 320. The snaps 346 allow the bias plate 340, including the target 350, to be snapped off the carrier 320 to allow convenient replacement by a user instead of specially trained service personnel.

The resilient members collectively provide sufficient preload of the bias plate 340 to urge the bias plate 340 toward the surface 116 of the scan bar 110. In one example, each resilient member is a coil spring 330. In other examples, the resilient member is a leaf spring, a compressible material, or another suitable component. If no document is inserted for scanning, the coil springs 330 urge the bias plate 340 against the surface 116 of the scan bar 110. If a document is inserted for scanning, the coil springs 330 urge the bias plate 340 against the document 220 whose surface 222 is in turn urged against the surface 116 of the scan bar 110. The coil springs 330 are tuned with regard to the force they apply in order to minimize or eliminate document jamming.

The carrier 320 retains the bias plate 340 and houses the coil springs 330. Each end of a coil spring 330 may be engaged by a post 322 on the carrier, and a corresponding post (not shown) on the bias plate 340. Each snap 346 connects to a corresponding receptacle 324. Force applied by the coil springs 330 to the bias plate 340 and carrier 320 assist in maintaining the connection between the bias plate 340 and the carrier 320. Disposing coil springs 330 at various intervals along the length of the carrier 320 allows each to be compressed a different amount, which assists the bias plate 340 to conform to irregularities in the surface 116 of the scan bar 110 and/or the document 220 to maintain the proper spacing to the scan bar 110.

The carrier 320 includes at least one pair of cam engagement pockets 326A, 326B (collectively 326). The pockets 326 may have an upside-down U shape sized to engage cams of the drive system 370, as discussed in more detail subsequently with reference to FIGS. 6A-6B, in order to translate the bias plate 340. Pockets 326A extend along the Y axis from a front side of the carrier 320, while pockets 326B extend along the Y axis from the opposite rear side of the carrier 320. Pockets 326A, 326B facilitate the use of multiple bias plate assemblies with a single drive system, as discussed subsequently with reference to FIG. 7.

The carrier 320 also includes at least one base engagement feature on the underside of the carrier 320. The base engagement feature may be, in one example, a rib 328 which slideably engages a guide feature on the base 310 to facilitate translation of the bias plate 340. In other examples, the base engagement feature is a pin, a slot, or another suitable feature.

The base 310 retains the carrier 320. In one example, at least one hook 312 on the base 310 each engage a corresponding slot 329 on the carrier 320. The base 310 also attaches the carrier 320 to the chassis (not shown) of the scanner. The base 310 is attached to the chassis in a fixed position. The base 310 also translatably engages the carrier 320. In some examples, the base 310 and carrier 320 are slidably engaged. This engagement is via at least one guide feature on the base 310. In one example, the guide feature is a guide slot 314 which engages a mating rib 328 of the carrier 320. The guide slot 314 controls the direction of translation of the bias plate 340, as discussed subsequently with reference to FIGS. 5A-5C.

Regarding the drive system 370, the drive 375 controllably rotates the cam shaft 380 to which it is coupled by a desired amount. For simplicity of illustration, the drive 375 is depicted as a single gear fixed to the cam shaft 380, and other portions of the drive 375 are not shown.

The cam shaft 380 rotates under control of the drive 375. At least one cam 385 is disposed at an angular position on the cam shaft 380. The shape and position of the cams 385 control the speed and distance of the bias plate translation as the cam shaft 380 is rotated. The cams 385 that engage an individual bias plate assembly are usually disposed at the same angular position on the cam shaft 380.

Each bearing 390 supports and locates the cam shaft 380. Each bearing 390 is affixed to the chassis of the scanner. In one example, the bearing is formed of a lubricious material with a favorable tribology such that the cam shaft 380 can rotate without excessive drag over the lifetime of the scanner.

In other examples, alternative mechanisms for translating the bias plate 340 may be utilized. As one example, a rack-and-pinion system could dispose a small gear mesh on the bottom of the carrier 320 to engage with a corresponding gear on the cam shaft 380.

Figure 5A:
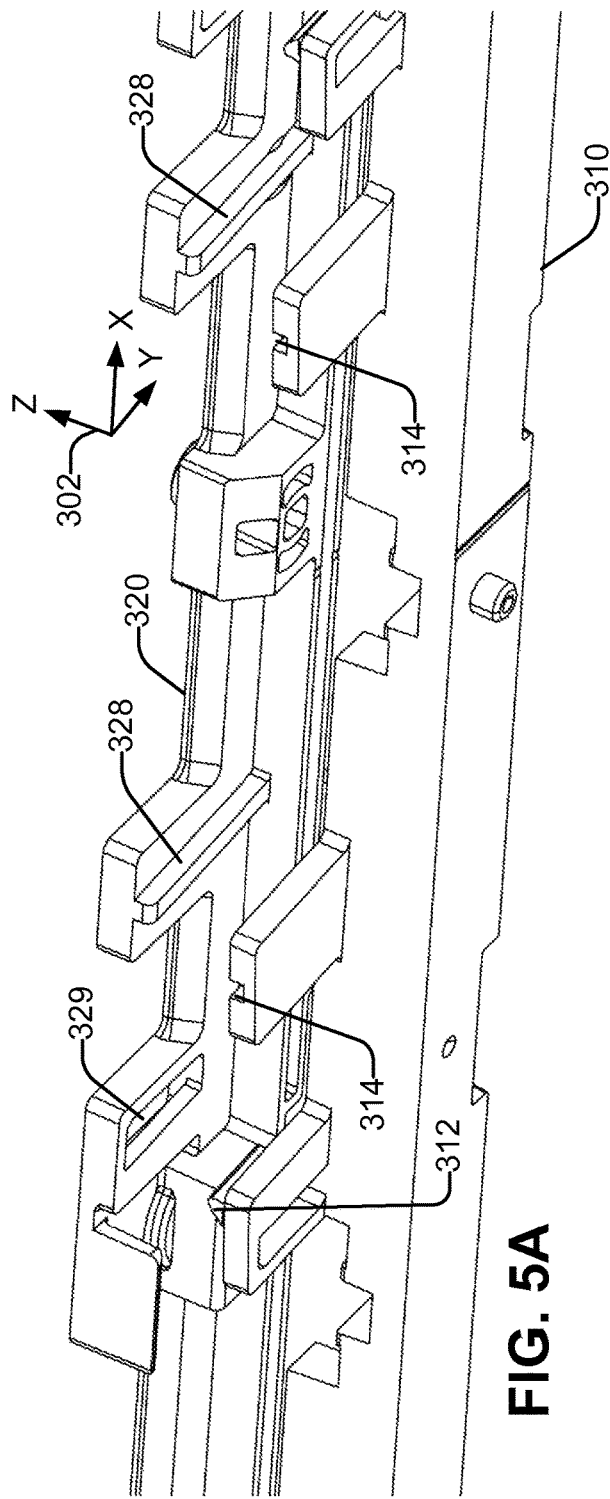
FIG. 5A is an isometric representation of a carrier and a base of the bias plate assembly of FIGS. 3-4 in accordance with an example of the present disclosure.
Figure 5C:
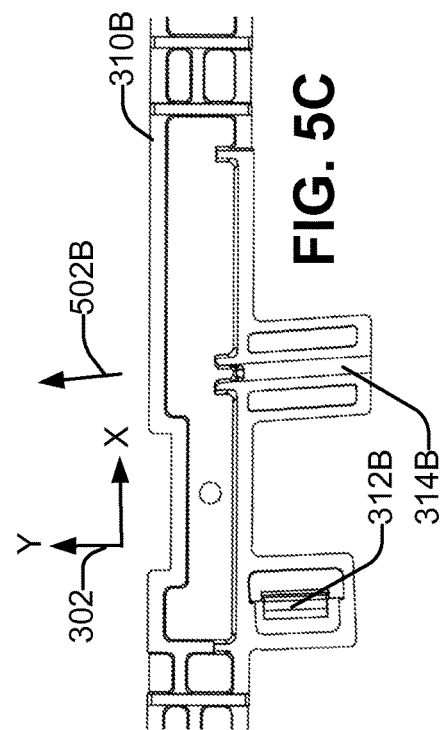
FIG. 5C is a two-dimensional top view of a base of the bias plate assembly of FIGS. 3-4 for translating the calibration target in a direction non-orthogonal to an array of imaging elements of a scan bar, in accordance with an example of the present disclosure.
Figure 5B:
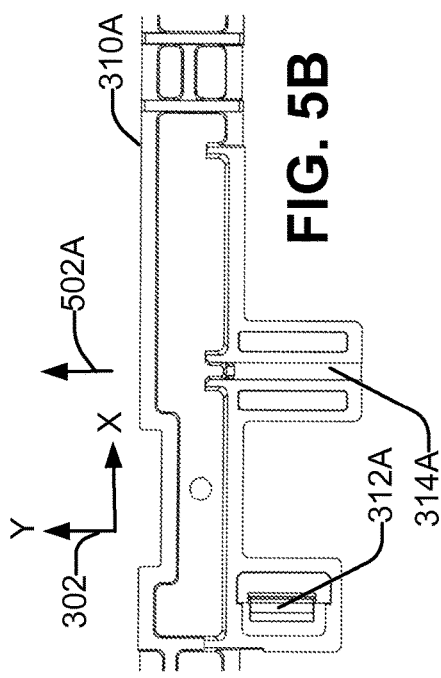
FIG. 5B is a two-dimensional top view of a base of the bias plate assembly of FIGS. 3-4 for translating the calibration target in a direction orthogonal to an array of imaging elements of a scan bar, in accordance with an example of the present disclosure.

Considering now in greater detail the carrier 320 and the base 310, and with reference to FIGS. 5A-C, the direction of translation of the bias plate 340 is governed by the direction of the rib 328 and the guide slot 314. In one example, the base 310A of FIG. 5B provides for translating the bias plate 340 (and the calibration target 350) in a direction 502A that is orthogonal to the linear array of imaging elements 112 of the scan bar 110 (FIGS. 1-2). In this case, the guide slot 314A and the rib 328 extend in the orthogonal direction 502A.

In another example, the base 310B of FIG. 5C provides for translating the bias plate 340 (and the calibration target 350) in a direction that is non-orthogonal to the linear array of imaging elements 112 of the scan bar 110. In this case, the guide slot 314B and the rib 328 extend in the non-orthogonal direction 502B. Such non-orthogonal translation may be advantageous in distinguishing a defective imaging element 112 from a scratch or blemish on the calibration target 350 that is oriented in the direction of translation and long enough to span the entire distance of translation. This is because, if the direction of translation is orthogonal to the linear array of imaging elements 112 of the scan bar 110, the entire scratch or blemish on the calibration target 350 that is oriented in the direction of translation is captured by the same imaging element(s) 112 throughout the translation. However, if the direction of translation is non-orthogonal to the linear array of imaging elements 112 of the scan bar 110, any scratch or blemish on the calibration target 350 will be captured by different imaging elements 112 as the target 350 is translated. This indicates that these various imaging elements 112 themselves are all functional, and that the calibration target 350 is scratched or blemished. As discussed subsequently with reference to FIG. 9, a scratch or blemish can be compensated for when doing the calibration.

In some examples, the length of each slot 329 on the carrier 320 is longer in the direction of translation of the bias plate 340 than the length of its corresponding hook 312 on the base 310. This allows the slot 329 to translate with respect to the hook 312 during translation of the bias plate 340. The hook 312, and its mating slot 329, are angled in the same direction 502A, 502B as the guide slot 314 and rib 328. Hooks 312A, 312B of FIGS. 5B-5C illustrate such angling for the orthogonal and non-orthogonal case respectively.

Figure 6A:
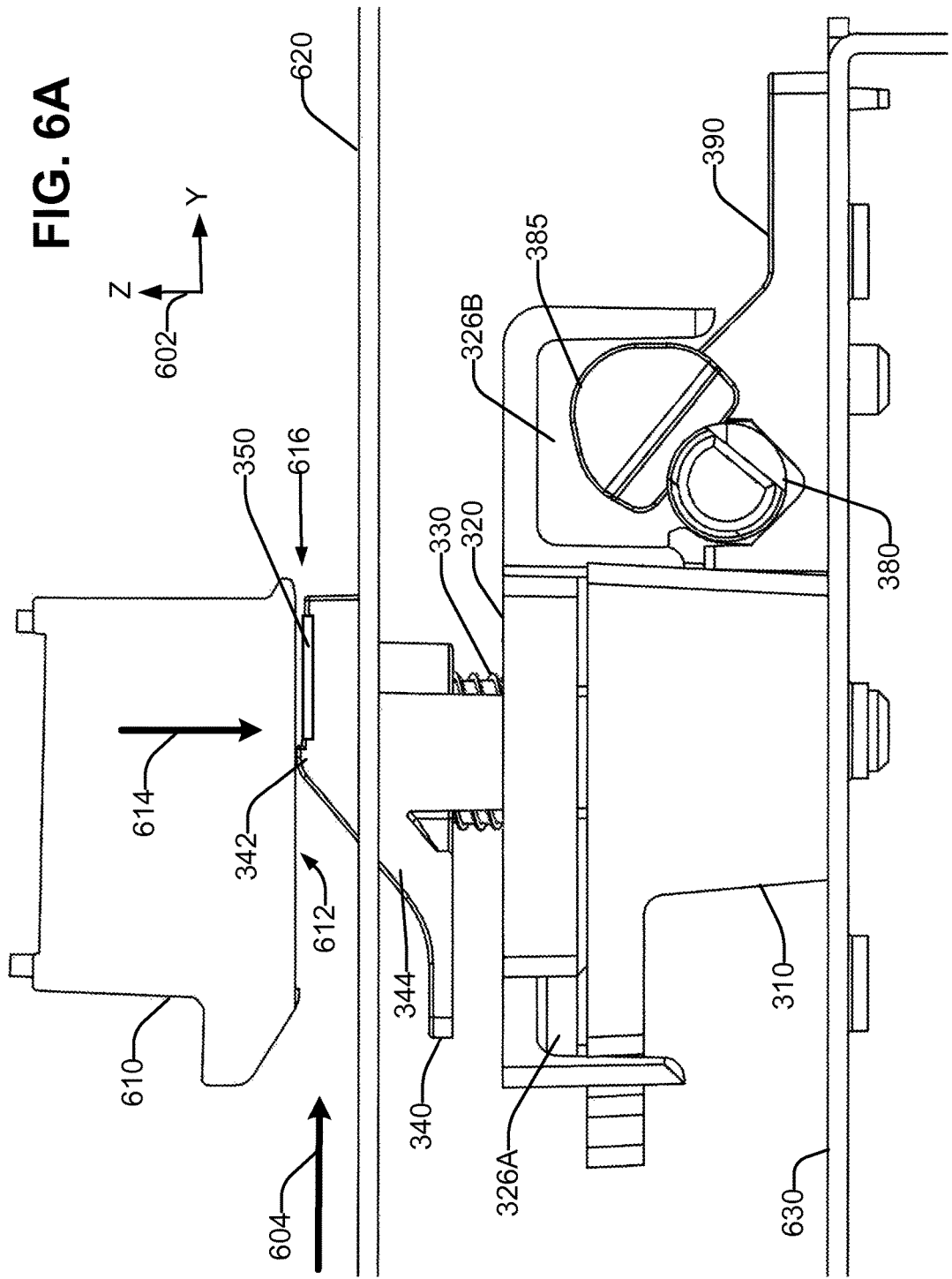
FIG. 6A is a schematic side view of the scanner showing the bias plate assembly of FIG. 3 in a rear-most document scanning position, in accordance with an example of the present disclosure.

Considering now the translation of the bias plate 340 including the calibration target 350, and with reference to a schematic side views of FIGS. 6A-6B of certain portions of the scanner, the scanner is oriented such that the front is to the left and the rear to the right. The base 310 is fixed to the scanner chassis 630. The calibration target 350, and a portion of the bias plate 340, protrude above a document-receiving platen 620 through an aperture in the platen 620. In FIG. 6A, the bias plate 340 and calibration target 350 are positioned at a rear-most document scanning position, and the coil springs 330 have urged the rib 342 of the bias plate into contact with the viewing surface 612 of a scan bar 610. The cam shaft 380 is rotated clockwise an amount such that the cam 385 contacts the external right side wall of the pocket 326B of the carrier 320, and continues to rotate to translate the carrier 320 and its attached bias plate 340 and calibration target 350 into the rear-most document scanning position, where it is maintained during scanning. A document is fed into the scanner in direction 604 above the platen 620, and the lead-in 344 of the bias plate 340 directs the document between the rib 342 and the viewing surface 612. The bias plate 340 is pressed down by the document to allow it to flow through the scanner, compressing the coil spring 330 a corresponding amount. The document is imaged by the scan bar 610 at the line-of-sight 614. The rib 342 serves as the wear point for contact with the document and creates a gap 616 between the calibration target 350 and the scan bar viewing surface 612, thus protecting the calibration target 350 from damage by the document.

In FIG. 6B, the bias plate 340 and calibration target 350 are illustrated positioned at a front-most position within the scanner, after being translated a distance in a direction having at least a component 618 in the −Y direction of the coordinate system 602 during a calibration process. In the calibration process, no document is inserted in the scanner. To translate the bias plate 340 and calibration target 350, the cam shaft 380 is rotated counter-clockwise an amount such that the cam 385 contacts the internal left side wall of the pocket 326B of the carrier 320, and continues to rotate to translate the carrier 320 and its attached bias plate 340 and calibration target 350 from the rear-most position into the front-most position. During translation, the imaging elements of the scan bar 610 each image a zone (e.g. zone 147 or zone 149, FIG. 1) of the calibration target 350. In the front-most position of FIG. 6B, the line-of-sight 614 views a different position of the calibration target 350 than the rear-most position of FIG. 6A. The calibration process is described subsequently in greater detail with reference to FIG. 9.

Figure 7:
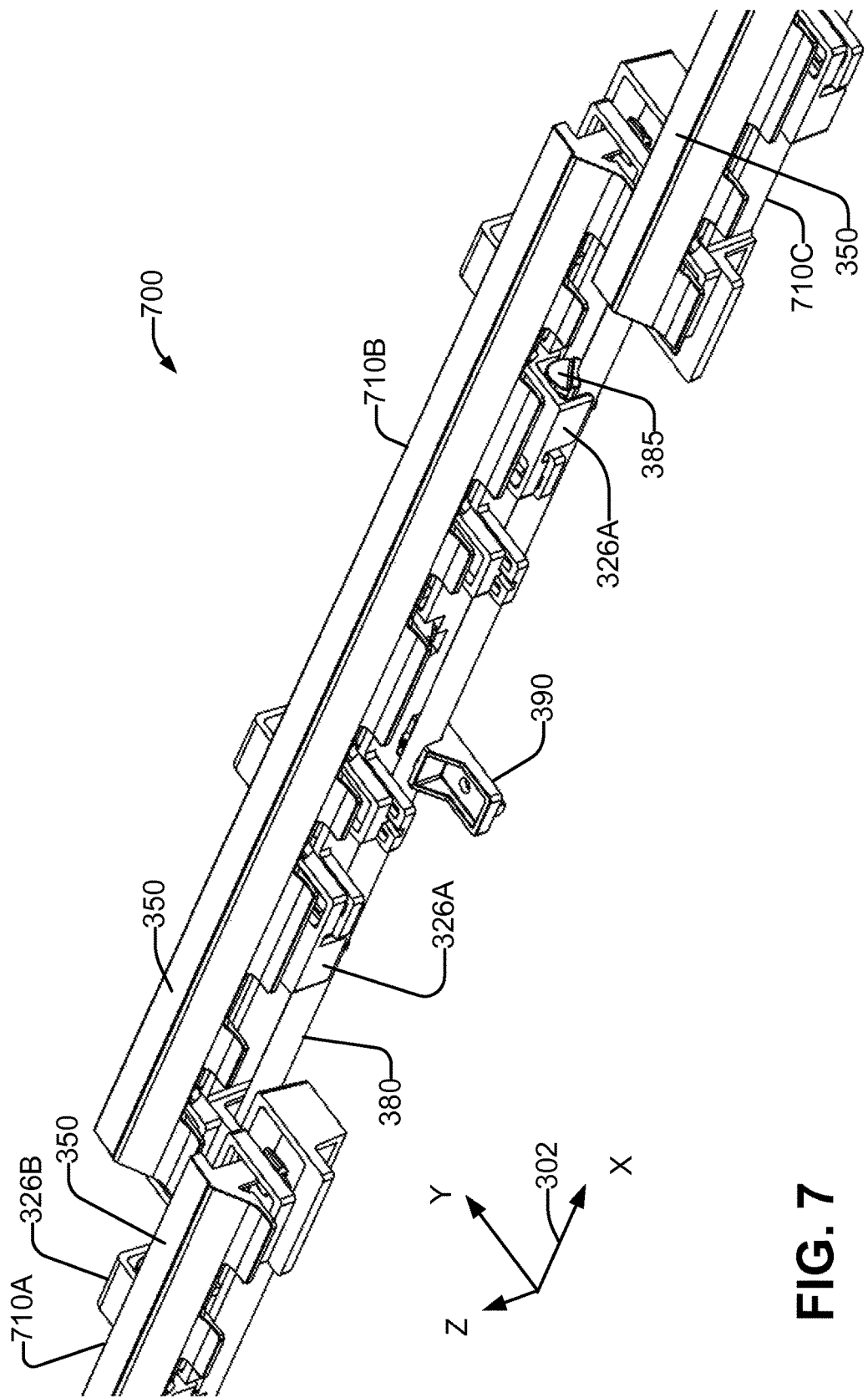
FIG. 7 is an isometric representation of an array of multiple offset, staggered bias plate assemblies each having a translatable calibration target, and a common drive system for the assemblies, of a document scanner in accordance with an example of the present disclosure.

Considering now an example array of multiple offset, staggered bias plate assemblies for a corresponding array of multiple offset, staggered, fixed-position scan bars, and with reference to FIG. 7, a multiple scan bar array may be used for scanning documents having widths greater than the span of a single scan bar. The scan bars may be offset from each other so as to provide an overlap area between every two scan bars where both scan bars can image the corresponding portion of the document. The images captured by each scan bar can be stitched together to form a composite image representing the entire document.

An example array 700 includes three translatable bias plate assemblies 710A-710C (collectively 710). Each bias plate assembly 710 may be the bias plate assembly 300 (FIG. 4), and each bias plate assembly 710 includes a calibration target. In FIG. 7, a portion of each end bias plate assembly 710A, 710C is illustrated, while all of the middle bias plate assembly 710B is illustrated. Each bias plate assembly 710 includes a calibration target 350.

The example array 700 has a single common drive system that translates all of the bias plate assemblies 710 and calibration targets. The cams 385 on the single cam shaft 380 may engage the front pockets 326A or the rear pockets 326B of an individual bias plate assembly 710. For example, the cams 385 engage the rear-side pockets 326B of each end bias plate assembly 710A, 710C, while the cams 385 engage the front-side pockets 326A of the middle bias plate assembly 710A.

In scanners with a multiple bias plate assembly array 700, the bias plate assemblies 710 may translate in the same direction. In some examples, the cams 385 are fixed at the same angular position on the cam shaft 380 so as to translate all bias plate assemblies 710 synchronously or in unison. In other examples, the cams 385 for each bias plate assembly 710 can be fixed at different angular positions on the cam shaft 380 so as to translate the various bias plate assemblies 710 sequentially. Sequential translation of bias plate assemblies may be useful in reducing bandwidth requirements for calibration processing, since the calibration of different scan bars can be performed at different times, rather than simultaneously.

Figure 8:
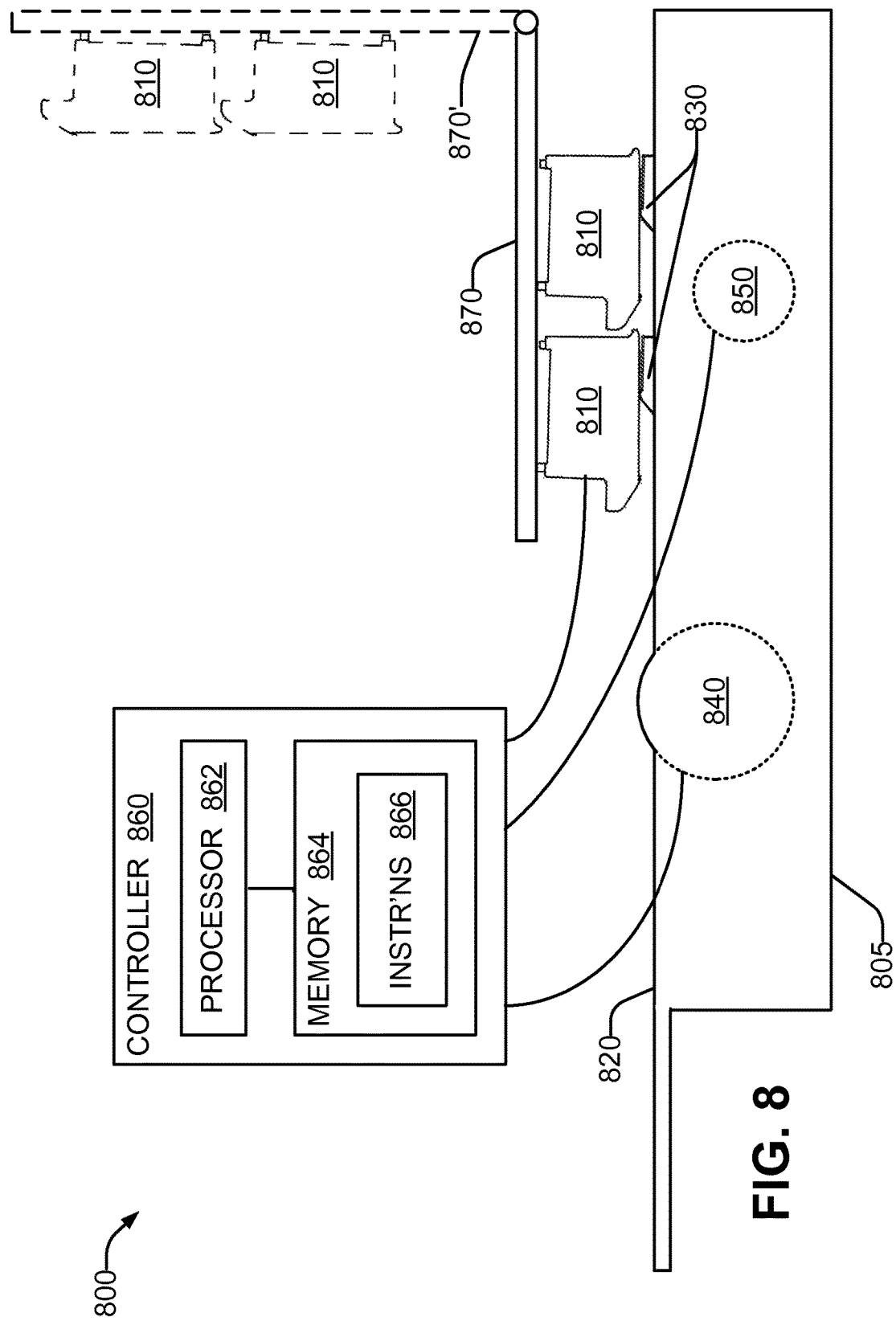
FIG. 8 is a schematic side representation of a document scanner having an array of scan bars positioned in an operational position and in a service position, in accordance with an example of the present disclosure.

Considering now a schematic representation of an example document scanner, and with reference to FIG. 8, a scanner 800 includes plural scan bars 810 in a staggered arrangement. A platen 820 is located on the surface of a housing 805, a portion of which is illustrated. The upper portion of bias plate assemblies 830 each having a calibration target protrudes from the housing 805 above the platen 820. Each bias plate assembly 830 may be the bias plate assembly 300 (FIG. 4). The scanner 800 also includes a document transport mechanism 840, a drive system 850 for the bias plate assemblies 830, and a controller 860. The controller 860 is communicatively coupled to the document transport mechanism 840, the drive system 850, and the scan bars 810.

The controller 860 includes a processor 862 coupled to a computer-readable medium such as a memory 864. The processor 862 executes instructions 866 stored in the memory 864 to control the document transport mechanism 840 to feed documents through the scanner 800, the scan bars 810 to image the documents and/or the calibration targets, and drive system 850 to translate the bias plates and calibration targets of the bias plate assemblies 830.

The scan bars 810 may be attached to a structural member of the scanner 800. In some examples, the structural member is attached to a movable cover of the scanner 800. The structural member is depicted in two different positions: an operating position 870 (solid line) and a service position 870' (dashed line).

During operation, the structural member positions scan bars 810 in their normal operating position 870 adjacent bias plate assemblies 830. For servicing the bias plate assemblies 830 or other purposes, the scan bars 810 are moved out of their operational position when the structural member is moved to the service position 870'. In the service position 870', the user of the scanner has access to the bias plate assemblies 830, and can easily clean, remove, and/or replace the bias plate (e.g. bias plate 340, FIGS. 3-4).

Figure 9:
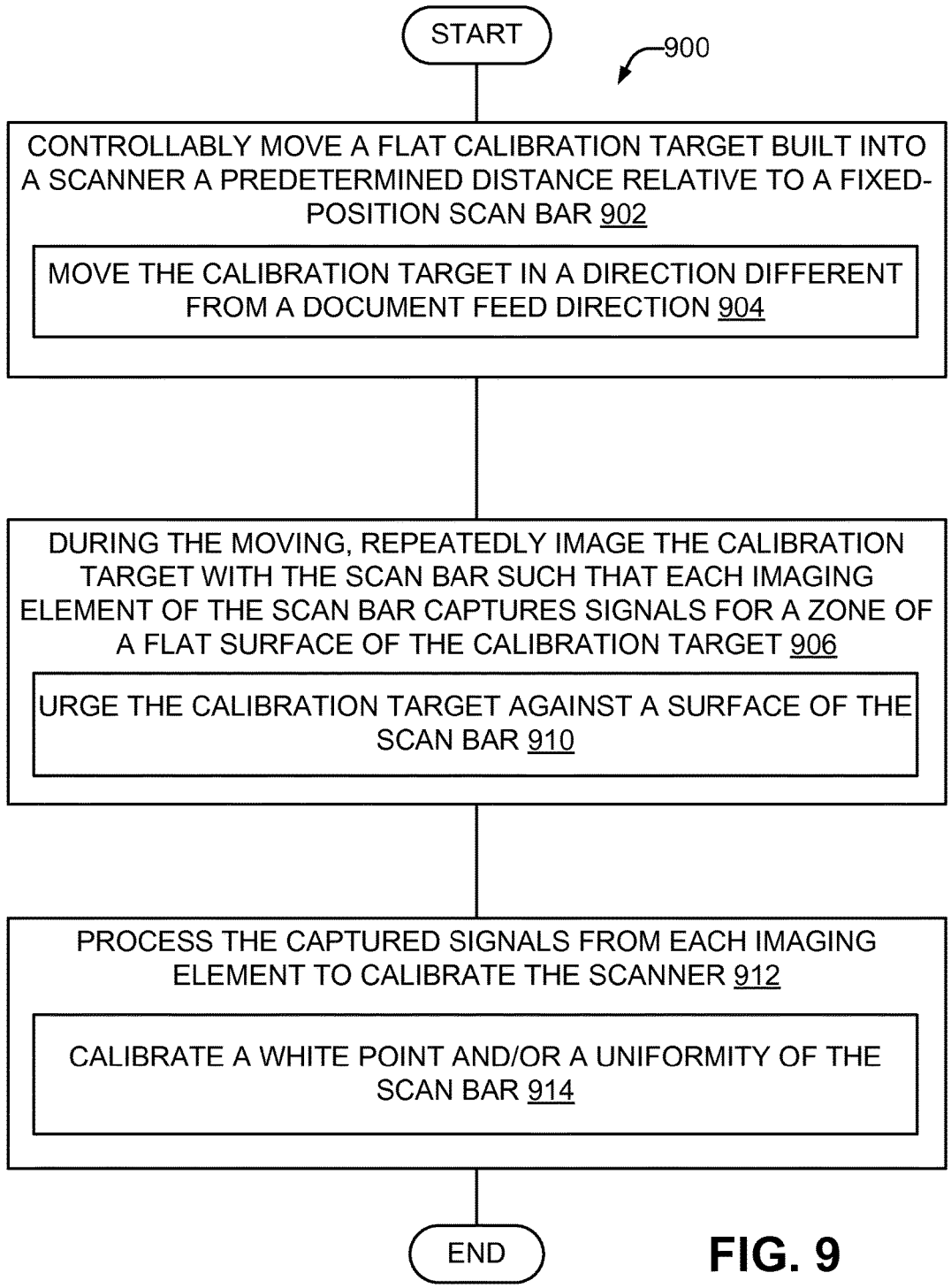
FIG. 9 is a flowchart in accordance with an example of the present disclosure of a method of calibrating a document scanner without use of a calibration document.

Consider now, with reference to FIG. 9, one example method for calibrating a document scanner without use of a calibration document fed through the scanner. The flowchart of FIG. 9 may be considered as steps in a method implemented in the scanner, or in its controller. Alternatively, the flowchart of FIG. 9 may be considered as a flowchart of at least a portion of the scanner or its controller. The scanner may be the scanner 100 (FIG. 1), 200 (FIG. 2), or 800 (FIG. 8). A method 900 begins at 902 by controllably moving a planar, flat translatable calibration target built into the scanner a predetermined distance relative to a fixed-position scan bar of the scanner. The target may be moved from an initial position used during document scanning. In some examples, the calibration target is translated within the plane of the surface of the calibration target. In some examples, at 904, the calibration target is moved in a direction different from a document feed direction of the document through the scanner.

At 906, the calibration target is repeatedly imaged with the scan bar during the moving such that each imaging element of the scan bar captures image signals for a zone (e.g. zone 147 and/or 149) of a flat surface of the calibration target. In some examples, at 910, the calibration target is urged against an imaging surface of the scan bar during the moving.

At 912, the captured image signals from each imaging element are processed to calibrate the scanner. In some examples, at 914, where the calibration target 140 (FIGS. 1-2), or its planar surface 142, is a uniform white color, the processing includes calibrating the scan bar for white point and uniformity. Each imaging element of a scan bar may have a different response characteristic (photo response non-uniformity, or PRNU) from other imaging elements. Calibrating for white point involves generating a white point calibration constant per color for an imaging element based on the output of that imaging element resulting from scanning the white calibration target. Calibrating for uniformity involves generating these calibration constants for all imaging elements of the scan bar in order to make the response from all imaging elements uniform across the scan bar. Doing so can also account for non-uniformities in the light source of the scanner which illuminates the object (in this case the calibration target) which is being scanned. These calibration constants are then utilized during subsequent scans to generate a uniform response having the correct color balance from all the imaging elements of the scan bar. In determining white point and uniformity, the series of images corresponding to the zone (e.g. zone 147 and/or 149) imaged by an imaging element during translation of the calibration target are processed. Such processing 912 reduces or eliminates the effect on the white point and uniformity of blemishes, scratches, or other damage to the calibration target. For example, the processing may average the series of images, or may discard or give less weight to outliers in the series of images which may correspond to the damage. As a result, the processing 912 generates a more accurate calibration than a calibration which is based on measurements made with a static calibration target.

Consider now, with reference to FIG. 10, one example method for scanning a document. The flowchart of FIG. 10 may be considered as steps in a method implemented in the scanner, or in its controller. Alternatively, the flowchart of FIG. 10 may be considered as a flowchart of at least a portion of the scanner or its controller. The scanner may be the scanner 100 (FIG. 1) or 800 (FIG. 8). A method 1000 begins at 900 by calibrating a document scanner without use of a calibration document being fed through the scanner. In some examples, at 1002, the calibration 900 is automatically initiated by the scanner without user intervention and without feeding a calibration medium into the scanner. In some examples, at 1004, a user replaces the calibration target prior to the calibration 900. In some examples, at 1006, the calibration target is returned to an initial position after the calibration 900. The initial position may be a document scanning position of the target.

At 1008, a document is fed through the scanner between the scan bar and the calibration target. At 1010, strips of the document are sequentially imaged with the scan bar as the document is being fed through the scanner. During this imaging, the calibration target is maintained in the initial (scanning) position. At 1012, the imaged strips are processed to construct a digital representation of the scanned document.

Terms of orientation and relative position (such as "top," "bottom," "side," and the like) are not intended to require a particular orientation of any element or assembly, and are used for convenience of illustration and description.

In some examples, at least one block or step discussed herein is automated. In other words, apparatus, systems, and methods occur automatically. As defined herein and in the appended claims, the terms "automated" or "automatically" (and like variations thereof) shall be broadly understood to mean controlled operation of an apparatus, system, and/or process using computers and/or mechanical/electrical devices without the necessity of human intervention, observation, effort and/or decision.

From the foregoing it will be appreciated that the document scanner and methods provided by the present disclosure represent a significant advance in the art. To recap just a few aspects of this advance, a large planar calibration target parallel to the scan bar minimizes sensitivity to part and assembly tolerances, and minimized luminance variation during calibration and scanning. A relatively long distance of translation of the calibration target during a calibration process maximizes the ability to compensate for damage to, or blemishes on, the calibration targets. And where the translation of the calibration target during calibration is non-orthogonal to the linear array of the scan bar, damage or blemishes on the target can be distinguished from defective imaging elements and can be factored out of the calibration. Where the spacing between the calibration target and a translucent or transparent document scanned is sufficiently small, the calibration target provides a shadow-eliminating background during scanning. A leading rib protects the calibration target from damage during document scanning, and the calibration target can be easily cleaned or replaced by the user of the scanner.

Although several specific examples have been described and illustrated, the disclosure is not limited to the specific methods, forms, or arrangements of parts so described and illustrated. This description should be understood to include all novel and non-obvious combinations of elements described herein, and claims may be presented in this or a later application to any novel and non-obvious combination of these elements. The foregoing examples are illustrative, and no single feature or element is essential to all possible combinations that may be claimed in this or a later application. Unless otherwise specified, steps of a method claim need not be performed in the order specified. Similarly, blocks in diagrams or numbers (such as (1), (2), etc.) should not be construed as steps that must proceed in a particular order. Additional blocks/steps may be added, some blocks/ steps removed, or the order of the blocks/steps altered and still be within the scope of the disclosed examples. Further, methods or steps discussed within different figures can be added to or exchanged with methods or steps in other figures. Further yet, specific numerical data values (such as specific quantities, numbers, categories, etc.) or other specific information should be interpreted as illustrative for discussing the examples. Such specific information is not provided to limit examples. The disclosure is not limited to the above-described implementations, but instead is defined by the appended claims in light of their full scope of equivalents. Where the claims recite "a" or "a first" element of the equivalent thereof, such claims should be understood to include incorporation of one or more such elements, neither requiring nor excluding two or more such elements. Where the claims recite "having", the term should be understood to mean "comprising".

What is claimed is:

1. A document scanner, comprising:
a fixed-position scan bar having a linear array of imaging elements aimed in an imaging direction;
a built-in translatable calibration target spaced apart from and parallel to the linear array, the target having a planar surface orthogonal to the imaging direction and spanning the length of the linear array, and the target translatable during a calibration in a direction in a plane of the surface,
a compliant bias plate having the calibration target; and
a resilient member to urge the compliant bias plate toward the linear array.

2. The scanner of claim 1, comprising:
a carrier removably attached to the compliant bias plate;
a base translateably attached to the carrier and fixedly attached to a chassis of the scanner; and
wherein the resilient member is retained between the bias plate and the carrier, the bias plate movable toward the carrier in the imaging direction to compress the resilient member.

3. The scanner of claim 2, comprising:
a drive system coupled to the carrier to controllably translate the carrier relative to the base.

4. The scanner of claim 1, wherein the resilient member is to urge the bias plate against a housing of the linear array, and wherein the bias plate conforms to a contacting surface of the housing.

5. The scanner of claim 4 wherein a rib of the compliant bias plate is urged against the housing, the rib maintaining a predefined spacing between the calibration target and the housing.

6. The scanner of claim 1, wherein the planar surface of the calibration target has a uniform color and is a background for scanning transparent and translucent documents.

7. The scanner of claim 1, wherein the direction of target translation in the plane of the planar surface is non-orthogonal to the linear array of imaging elements.

8. A method of calibrating a document scanner without a calibration document, comprising:
controllably moving a flat translatable calibration target built into the scanner a predetermined distance relative to a fixed-position scan bar of the scanner;
during the moving, repeatedly imaging the calibration target with the fixed-position scan bar such that each imaging element of the fixed-position scan bar captures signals for a zone of a flat uniform color surface of the calibration target; and
processing the captured signals from each imaging element to calibrate the scanner;
after the processing:
returning the calibration target to an initial position;
feeding a document through the scanner between the fixed-position scan bar and the calibration target;
during the feeding, sequentially imaging strips of the document with the fixed-position scan bar with the calibration target in the initial position; and
processing the imaged strips to construct a digital representation of the document.

9. The method of claim 8, wherein the processing includes calibrating at least one of white point and uniformity of the fixed-position scan bar.

10. The method of claim 8, wherein the moving moves the calibration target in a direction different from a document feed direction.

11. The method of claim 8, further comprising:
during the moving, urging the calibration target against a surface of the fixed-position scan bar.

12. A document scanner, comprising:
a scan bar array of overlapping staggered fixed-position scan bars each having a linear array of imaging elements;
an array of overlapping staggered translatable calibration targets spaced apart from and parallel to the scan bar array, each target having a planar surface that spans a length of a corresponding imaging element array and is imageable by the imaging elements of the corresponding linear array; and
a single drive system coupled to all the calibration targets to controllably translate the calibration targets relative to the scan bars during a calibration operation, and
wherein the single drive system comprises:
a rotatable cam shaft;
a plurality of cams each fixed to the cam shaft at an angular position; and
a plurality of cam engagement features each coupled to a corresponding one of the calibration targets and engaged with a corresponding one of the cams.

* * * * *